United States Patent [19]
Parsons, Jr. et al.

[11] Patent Number: 6,085,247
[45] Date of Patent: Jul. 4, 2000

[54] SERVER OPERATING SYSTEM FOR SUPPORTING MULTIPLE CLIENT-SERVER SESSIONS AND DYNAMIC RECONNECTION OF USERS TO PREVIOUS SESSIONS USING DIFFERENT COMPUTERS

[75] Inventors: John E. Parsons, Jr.; Bradley J. Graziadio, both of Redmond; Oshoma Momoh, Seattle, all of Wash.

[73] Assignee: Microsoft Corporation, Redmond, Wash.

[21] Appl. No.: 09/093,969

[22] Filed: Jun. 8, 1998

[51] Int. Cl.⁷ ...................................................... G06F 15/16
[52] U.S. Cl. ........................... 709/227; 709/203; 709/217; 709/219; 709/225; 709/228; 709/237; 705/400; 705/34
[58] Field of Search .................................... 709/203, 217, 709/219, 225, 227, 228, 237, 202, 303, 223, 221, 226, 224; 705/400, 34; 375/219; 395/500.44; 379/88.23; 340/825; 348/7; 455/420; 370/230

[56] References Cited

U.S. PATENT DOCUMENTS

| | | | |
|---|---|---|---|
| 5,594,921 | 1/1997 | Pettus | 70/11 |
| 5,764,736 | 6/1998 | Shachar et al. | 379/93.09 |
| 5,774,551 | 6/1998 | Wu et al. | 380/25 |
| 5,805,118 | 9/1998 | Mishra et al. | 345/1 |
| 5,812,819 | 9/1998 | Rodwin et al. | 709/227 |
| 5,826,027 | 10/1998 | Pedersen et al. | 709/221 |
| 5,826,085 | 10/1998 | Bennett et al. | 709/303 |
| 5,835,724 | 11/1998 | Smith | 709/227 |
| 5,881,239 | 3/1999 | Desgrousilliers | 709/228 |
| 5,918,228 | 6/1999 | Rich et al. | 707/10 |

*Primary Examiner*—Frank J. Asta
*Assistant Examiner*—Beatriz Prieto
*Attorney, Agent, or Firm*—Lee & Hayes, PLLC

[57] ABSTRACT

A server operating system supports multiple client-server sessions and enables a user to begin a session and later dynamically reconnect to that session even if the user uses two different client computers. The operating system has a multi-user session manager to enable multiple client-server sessions on the server and a multi-user stack protocol manager to manage one or more protocol stacks used in communicating with the clients. When a user connects to the server via a first client, the stack protocol manager assigns a first protocol stack to this first client-server connection and the session manager creates a first session for the user. When the user subsequently reconnects to the server using a second client that is different from the first client, the stack manager assigns a second protocol stack to a second client-server connection and the session begins creating a second session for the user. During this latter process, however, the session manager recognizes that the user is affiliated with the first session. The session manager adapts the first session to conform to the system configuration of the second client. The session manager then reassociates the second protocol stack with the reconfigured first session so that the user is returned to his/her original session, even though they logged on from a different client.

31 Claims, 8 Drawing Sheets

SERVER OPERATING SYSTEM FOR SUPPORTING MULTIPLE CLIENT-SERVER SESSIONS AND DYNAMIC RECONNECTION OF USERS TO PREVIOUS SESSIONS USING DIFFERENT COMPUTERS

TECHNICAL FIELD

This invention relates to client-server computer systems. More particularly, this invention relates to server operating systems executing on servers in the client-server computer systems.

BACKGROUND

Most people are generally familiar with computer operating systems. An operating system is the code or computer program that provides an environment in which other computer programs can run. The operating system manages the system resources, such as processing resources, memory allocation, and I/O devices, to enable other programs to easily take advantage of these resources. Some operating systems are multitasking, meaning they support concurrent operation of more than one task. A multitasking operating system divides the resources among various processes, giving each process access to memory, processing resources, and at least one execution thread.

In the client-server environment, the server operating system is also called upon to handle communication interaction with client-based applications. The client operating system locates a server and requests a connection with the server and the server allocates resources to handle requests from the client.

One well-known server operating system is the Windows NT server operating system from Microsoft Corporation. The Windows NT server operating system is a multitasking, extensible, scalable operating system that can be implemented on standard personal computers. The Windows NT server operating system is well documented. For background information, the reader is directed to the book entitled *Inside Windows NT*, which is written by Helen Custer and is published by Microsoft Press (copyright 1993). This book is incorporated by reference.

In many client-server systems, the client computer is itself a full-functioning general-purpose computer, having its own operating system, processing resources, memory resources, and so forth. Examples of such clients include workstations, desktop computers, laptops, and the like. In some client-server systems, however, the client computer is a simple machine that is implemented with less functionality than a general-purpose computer. For instance, the client might be implemented as a terminal, which typically provides just enough functionality to enable access to the server computer over a network. The terminal has no operating system; rather, the operating system and applications reside at the server, and the processing takes place at the server.

More recently, low cost computers known as "network computers" or "NCs" have been introduced as a means for providing access to a network. Network computers have a display, a keyboard, a network port, and limited processing capabilities. Network computers can provide some limited local processing, but are primarily reliant on the server for most processing. Presently available network computers are primarily configured to run applications written in Java, a language introduced by Sun Microsystems. A close cousin to the NCs is another type of low cost computer, known as "Net PCs", which can run both Windows-based and Java-based applications.

A technology marketed under the name "WinFrame" from Citrix Systems Inc. extends the Windows NT server operating system to support multiple client-server windowing sessions for connected clients, where each session provides a windowing environment for the connected client. The WinFrame technology essentially replicates low kernel-level support routines, such as USER, CONSOLE, and GDI drivers, to provide multiple windowing sessions on the same server. Each session is tailorable to support a system configuration (i.e., display, mouse, keyboard) of a particular connected client.

With the WinFrame technology, a client can connect to the Windows NT server and begin a windowing session. To the user, it appears as if the client is a standalone Window-enabled computer that is running its own Windows-brand operating system. However, the session is actually taking place on the server computer, remote from the client, and the client is merely running a local graphical user interface to provide entry to the session. In this regard, the WinFrame technology is particularly well suited for low intelligent client computers, such as terminals and network-centric computers, because the client need not be capable of running its own operating system. However, the WinFrame technology is equally well suited for fully enabled clients.

One problem with the Citrix WinFrame technology is a lack of usability from the user perspective. Each session is bound to a particular client machine and does not consider the requirements of a user, who may in fact log on to the server from different physical machines.

To exemplify the problem, consider a common scenario. A user logs onto the Windows NT server from a client computer at the user's workplace. The workplace client is a desktop PC with a large 20" VGA display with 1024×768 resolution. At quitting time, the user decides to temporarily halt the session and disconnects from the server. Later that evening, the user reconnects to the server from a home computer, which is a laptop computer with an 11" color display of 640×480 resolution. When the laptop connects to the server, the Citrix WinFrame technology creates a new session for this new client machine. Since the user is employing different clients, the user is not permitted to reconnect to the old session. As a result, the user's previous session started on his/her work computer is not ported to the laptop computer because the server understands them as two distinct sessions started on two distinct machines.

Accordingly, there is a need to improve the server operating system to overcome this problem and to better focus on the needs of the user.

SUMMARY

This invention concerns a server operating system that supports multiple client-server sessions and enables a user to begin a session and later dynamically reconnect to that session even if the user employs two different clients.

According to one implementation, the operating system has a multi-user session manager to enable multiple client-server sessions on the server. The operating system further has a multi-user stack protocol manager to manage one or more protocol stacks, wherein each protocol stack facilitates communication with a corresponding client during a client-server session.

When a user connects to the server via a first client, the stack protocol manager assigns a first protocol stack to this first client-server connection. The session manager then creates a first session for the user. In the described implementation, the session is a windowing session that supports a windowing graphical user interface environment on the remote client. The session consists of various software modules to support a windowing environment, and includes various hardware drivers, such as keyboard drivers, display drivers, and protocol drivers. The drivers employed in the first session are selected to conform to the system configuration of the first client.

Sometime later, the user leaves the first session and disconnects the first client from the server. The server maintains the user's session at the server so that the user may return to it at a later time. The session can be ended, however, if the user expressly terminates the session prior to disconnecting the first computer from the server.

At a later time, the user reconnects to the server using a second client. The second client has a system configuration that is different than that of the first client. As an example scenario, the user might first log onto the server via a desktop computer at the user's workplace and then later via a laptop computer at the user's home. The second client connects to the server via a second client-server connection and the stack manager assigns a second protocol stack the second client-server connection. The session manager then begins creating a new, second session for the user.

During this process, however, the session manager recognizes that the user is affiliated with the first session. The session manager adapts the first session to conform to the system configuration of the second client. That is, the first session is reconfigured with a new set of one or more configuration parameters (e.g., a new display driver or protocol driver) to support the different system configuration of the second client.

The session manager then reassociates the second protocol stack with the reconfigured first session so that the user is returned to his/her original session, even though they logged on from a different client. The adaptation occurs solely at the server, and hence, it is invisible to the user. As a result, the user merely sees the same session. In the case of a changed display driver, for example, the user would see the same session, yet reformatted for the display of the second client.

Another aspect of this invention concerns using dynamic reassociation to accommodate multiple users who connect to the server from a single client computer. As an example of this situation, it is common for two bank tellers to concurrently use a single computer. In this case, the server detects when different users log onto the server via the same client. Upon detection, the server reassociates the protocol stack handling the client-server connection with the session affiliated with the present user. In this manner, the server can support multiple users, all of whom use the same computer.

BRIEF DESCRIPTION OF THE DRAWINGS

The same reference numbers are used throughout the drawings to reference like components and features.

DETAILED DESCRIPTION

Figure 1:
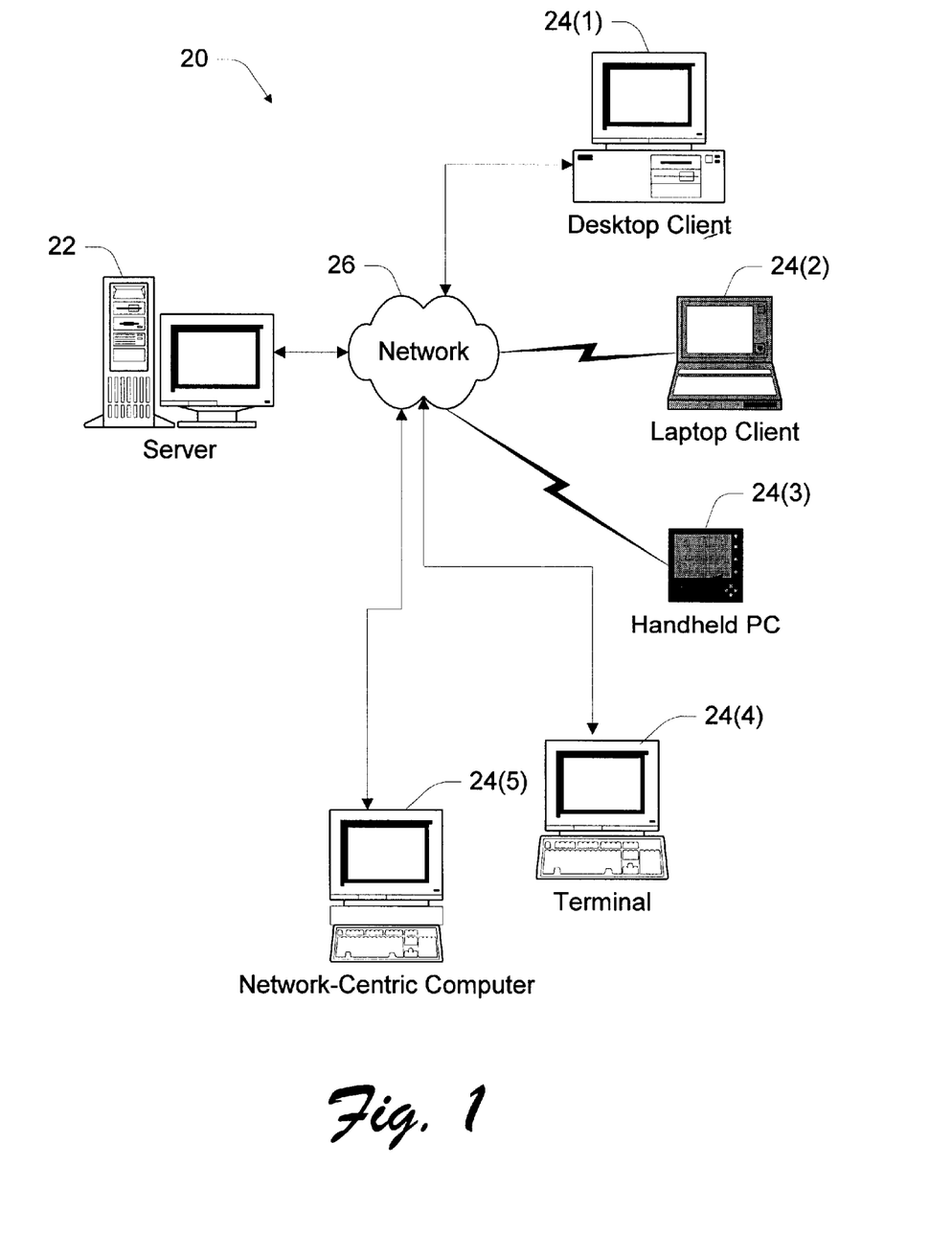
FIG. 1 is an illustration of a client-server computer system.

FIG. 1 shows a client-server computer system 20 comprising a server computer 22 connected to multiple clients 24(1)–24(5) via a network 26. The client-server computer system 20 is representative of many different architectures, including direct dialup via modem, enterprise LANs (local area networks), WANs (wide area networks), and the Internet. The network 26 can be implemented in a number of ways to support such networking contexts, including both wire-based technologies and wireless technologies. Aspects of this invention are not limited to one specific network architecture or network technology.

The server 22 is preferably implemented as a Windows NT server, which supports a windowing user interface environment. The server 22 is described in this context for discussion purposes. A more detailed description of the server 22 is given below with respect to FIG. 2. It is noted, however, that the server 22 may be implemented using an operating system other than Windows NT.

The clients 24(1)–24(5) represent various kinds of computers that may connect to the server 22 over the network 26. Client 24(1) is a conventional desktop personal computer (PC), which possesses a local operating system, processing unit, and storage system. As one example, the desktop client 24(1) is a general-purpose PC implemented with a Windows-brand operating system from Microsoft Corporation, such as Windows 95 or Windows 98. The desktop client 24(1) is a standalone computer that primarily interfaces with the server to access files or other information that is not locally stored.

Client 24(2) is illustrated as a portable laptop computer, which can be connected to the network 26 via a conventional network card or a dial-up modem connection. The laptop computer 24(2) is also a fully equipped, standalone computer that can be configured with its own operating system, processing unit, and storage system. The laptop client 24(2) may likewise be configured to run a Windows-brand operating system, such as Windows 95 or Windows 98.

Client 24(3) is a handheld PC, which generally possesses less functionality than a general-purpose computer. However, the handheld PC 24(3) is preferably equipped with a Windows-brand operating system, such as Windows CE from Microsoft Corporation.

Client 24(4) is a terminal computer, which is a low cost machine with minimal local processing and little local memory. The terminal computer includes a display, a keyboard, a mouse (optional), and enough intelligence to connect to a server. All applications run at the server and the terminal merely provides a connection point to the server-based processing.

Client 24(5) represents a network-centric computer, such as a Network Computer (or NC) or a Net PC. The network-centric computer client 24(5) primarily facilitates execution of server-based applications, but has some limited local processing capabilities for running Windows-based or Java-based applications.

Server Computer

Figure 2:
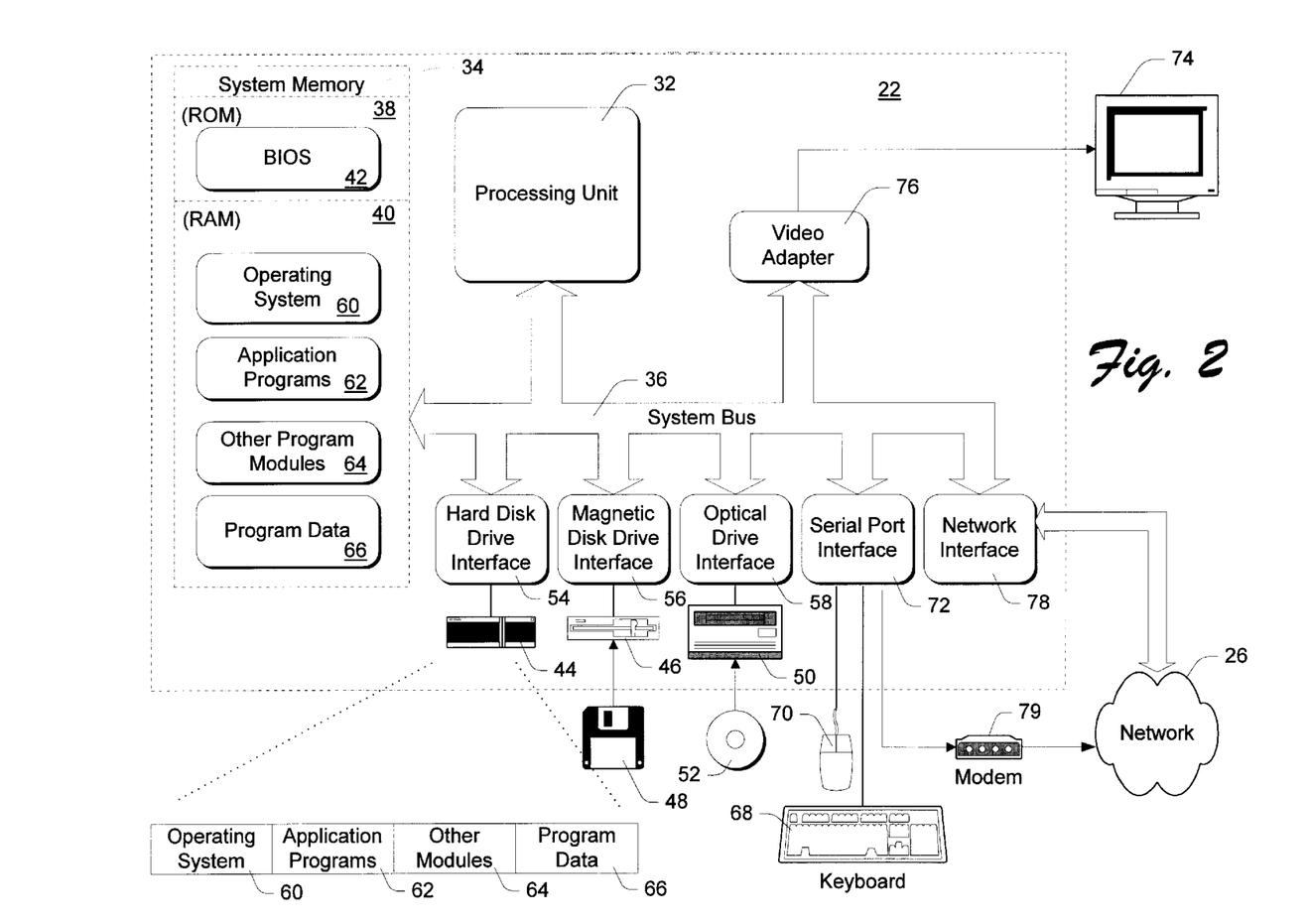
FIG. 2 is a block diagram of a server computer in the client-server computer system.

FIG. 2 shows an example implementation of the server computer 22, which is implemented as a general-purpose computer configured with the Windows NT operating system. The server 22 includes a processing unit 32, a system memory 34, and a system bus 36 that interconnects various system components, including the system memory 34 to the processing unit 32. The system bus 36 may be implemented as any one of several bus structures and using any of a variety of bus architectures, including a memory bus or memory controller, a peripheral bus, and a local bus.

The system memory 34 includes read only memory (ROM) 38 and random access memory (RAM) 40. A basic input/output system 42 (BIOS) is stored in ROM 38.

The server 22 has one or more of the following drives: a hard disk drive 44 for reading from and writing to a hard disk or hard disk array, a magnetic disk drive 46 for reading from or writing to a removable magnetic disk 48, and an optical disk drive 50 for reading from or writing to a removable optical disk 52 such as a CD ROM or other optical media. The hard disk drive 44, magnetic disk drive 46, and optical disk drive 50 are connected to the system bus 36 by a hard disk drive interface 54, a magnetic disk drive interface 56, and an optical drive interface 58, respectively. The drives and their associated computer-readable media provide non-volatile storage of computer readable instructions, data structures, program modules and other data for the server 22.

Although a hard disk, a removable magnetic disk 48, and a removable optical disk 52 are described, other types of computer readable media can be used to store data. Other such media include magnetic cassettes, flash memory cards, digital video disks, Bernoulli cartridges, random access memories (RAMs), read only memories (ROM), and the like. Additionally, the server 22 may be configured to serve data stored on an independent storage system, such as a RAID (redundant array of independent disks) storage system.

A number of program modules may be stored on the hard disk, magnetic disk 48, optical disk 52, ROM 38, or RAM 40. These programs include a server operating system 60, one or more application programs 62, other program modules 64, and program data 66.

A user may enter commands and information into the server 22 through input devices such as a keyboard 68 and a mouse 70. Other input devices (not shown) may include a microphone, joystick, game pad, satellite dish, scanner, or the like. These and other input devices are connected to the processing unit 32 through a serial port interface 72 that is coupled to the system bus 36, but may alternatively be connected by other interfaces, such as a parallel port, game port, or a universal serial bus (USB).

A monitor 74 or other type of display device is also connected to the system bus 36 via an interface, such as a video adapter 76. The server computer 22 has a network interface or adapter 78, a modem 79 or other means for establishing communications over the network 26, such as a T1 or T3 Internet connection. The modem 79 facilitates dialup connection from a client.

General Software Architecture

The computer system 20 implements a software architecture that enables the clients 24(1)–24(5) to run a Windows-brand operating system and applications on the server 22. The software architecture includes a server-based multi-client core, a client-based module, and a remote protocol that enables communications between the server and client.

The server-based multi-client core enables the server to host multiple, simultaneous client sessions. The multi-client core is resident as part of the operating system 60 and executes on processor 32. The multi-client core supports both windowing-enabled clients (i.e., clients that are capable of running a local windowing operating system, such as the desktop client 24(1), the laptop client 24(2), and the handheld PC client 24(3)) and non-windowing clients (i.e., clients that are incapable of running a local windowing operating system, such as terminal client 24(4) and network-centric client 24(5)).

The multi-client server core enables any of the clients to log into the server and run a windowing session at the server. In one embodiment, the multi-client server core implements the Citrix WinFrame technology that extends the Windows NT server operating system to support multiple windowing environments for multiple clients. The WinFrame technology provides the means for replicating client-server windowing sessions, as is described below in more detail with reference to FIGS. 3 and 4. The multi-client server core goes beyond the basic WinFrame technology, however, to offer a means for maintaining windowing sessions at the server and dynamically reconnecting users to their sessions even if the users reconnect using different clients.

The client-based module resides in memory at the client and executes on the client's processing unit. The client-based module contains code to run a graphical windowing user interface (UI). The code is capable of running on a broad range of hardware, including terminals, network-centric computers, Windows-enabled computers, UNIX-based computers, and DOS-based computer. To the user, the client appears to be running a local version of a windowing operating system, even though all of the operating system functionality is occurring at the server.

The protocol component of the software architecture allows the client to connect to the network and present the windowing UI to the user. One suitable protocol that may be used in system 20 is MS Remote Desktop Protocol, which is a highly scalable derivative of the T.128/T.120 protocol, an international, standard multichannel conferencing protocol. T.128/T.120 is a well-known protocol and will not be described in detail. For more information on T.128/T.120, the reader is directed to the T.120/T.128 standards from the International Telecommunications Union (ITU) which are hereby incorporated by reference.

In contrast to prior art client-server systems, the computer system 20 is tailored to view the server network as servicing the needs of a user, rather than supporting specific client computers. This ideology shift implies that the computer system 20 supports the user, regardless of which client 24 the user employs to access the server 22. Prior art client-server systems typically emphasize a machine-centric perspective, treating each connection in terms of the needs of a particular client configuration.

As an example of this dichotomy, a scenario presented in the Background section describes a user who logs onto the server from a workplace client computer, begins a session, stops the session without terminating it, and subsequently logs on from a home computer. In the prior art architecture, the server creates a new session for each client because they originated from two different clients with different system configurations. When the user logs on from the first client, the server creates a session that utilizes display drivers, keyboard drivers, and the like that are specific to support the particular client computer. The server might also use one type of protocol that is suitable for communicating with the client computer.

When the user logs on from the second client, the server creates another session that loads different display drivers, keyboard drivers, and the like that are specific to support the second client computer. The server might also employ a different type of communication protocol. Hence, the server creates machine-dependent sessions, even though the same user would like to continue the same session regardless of the machine from which he/she uses to connect to the server. The prior art represents a machine-centric architecture.

The computer system 20, on the other hand, is user centric. In the above scenario, the computer system 20 enables the user to connect to the server from one client, start and stop a session without termination, and later return to that same session from a different client. The server does not create a new session for the new client, but instead adapts the original session with the appropriate drivers, protocols, and configuration parameters to support the second client.

For example, suppose the user first logs on from a workplace computer with a large 20" VGA display with resolution of 1024×768. The server establishes a windowing session with the appropriate display driver to service a 20" VGA display with 1024×768 resolution. When the user subsequently logs on from his/her laptop computer with an 11" display of 640×480 resolution, the server begins to establish a new session. However, during the session initiation process, the server recognizes that the user is affiliated with a previous session. The server then modifies the previous session to employ a new display driver appropriate for an 11" display with 640×480 resolution. The server then automatically reassociates the user with the previous session. The work in progress is dynamically resized to the new 11" display and the user may continue from where he/she left off when working on the workplace computer.

The server operating system 60 advantageously enables a dynamic reassociation of users to their respective sessions, even if the users log on from different machines with different operating characteristics. The reassociation process occurs entirely at the server, with the server automatically adapting to the client. The process is invisible to the user and client computer.

One preferred way of implementing server operating system is described below with reference to FIGS. 3–6. Following this discussion, another aspect of this invention is described, which involves switching among multiple windowing sessions running at the server from a single client machine.

Server-Based Dynamic Reassociation

An aspect of this invention concerns reassociating users with their respective windowing sessions and automatically adjusting the windowing sessions to accommodate any new client system configurations. This dynamic reassociation takes place entirely at the server.

Figure 3:
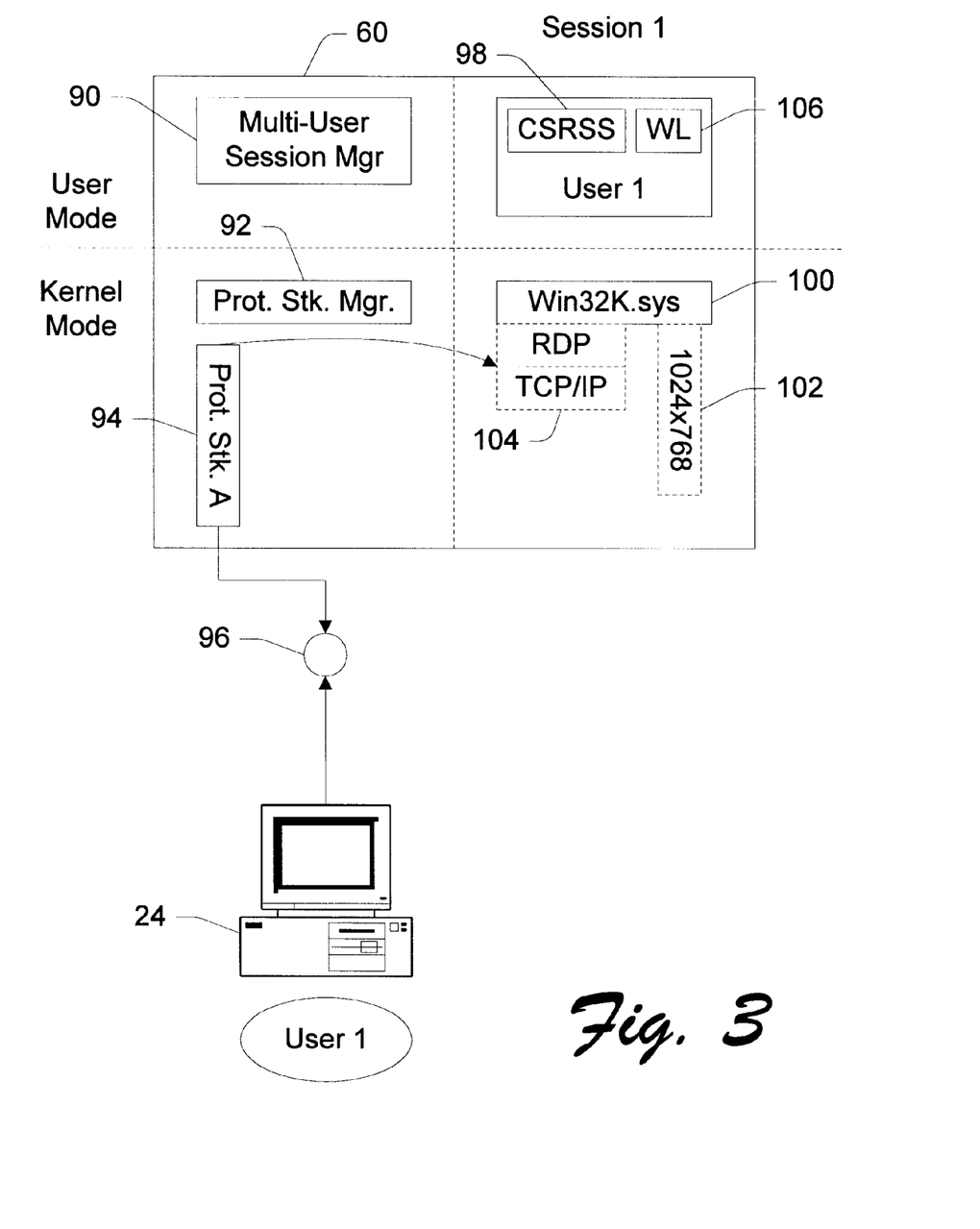
FIG. 3 is a block diagram of a portion of the server operating system, showing a single client-server windowing session.

FIG. 3 shows a portion of the server operating system 60, including the multi-client core that enables replication of the windowing modules to form multiple windowing sessions. The operating system 60 includes code that runs in a privileged processor mode, which is often referred to as the "kernel mode", and applications or other service routines that run in a non-privileged processor mode, commonly referred to as "user mode".

The operating system 60 includes a multi-user session manager 90 implemented in the user mode. The multi-user session manager 90 enables creation of multiple client-server windowing sessions that reside on the server for use by the client. The operating system 60 further includes a protocol stack manager 92 implemented in the kernel mode and closely interfaced with the session manager 90. Under the direction of the multi-user session manager, the protocol stack manager 92 creates and manages one or more protocol stacks, as represented in FIG. 3 by protocol stack 94, to facilitate communication with corresponding external clients during the client-server windowing sessions. The protocol stacks are implemented according to certain types of communications protocols, such as RDP over a TCP/IP transport, RDP over IPX, RDP on top of an asynchronous serial connection (modem), and the like.

One exemplary implementation of the session manager 90 and the protocol stack manager 92 is using the Intelligent Console Architecture (ICA) from Citrix Systems, Inc. The Citrix ICA extends the Windows NT server operating system to provide multiple windowing sessions for connected clients.

For discussion purposes, suppose a client 24(1) desires to run a server-based windowing session. The client 24(1) is illustrated as a Windows-enabled desktop computer. However, other types of clients may be used, including terminal clients and network-centric clients. The client 24(1) sends a connection request to a well-known connection port. The server operating system 60 accepts the connection request and creates a communication port, as represented by object 96. The communication port 96 provides the client with a handle to send messages or callbacks to the server.

The multi-user session manager 90 creates and launches a new transfer thread to service the new client request. The server operating system 60, and namely the protocol stack manager 92, assigns a protocol stack 94 to the communication port 96. The protocol stack then enters a connection query mode where client and server capabilities are subsequently exchanged such as keyboard layout/locale, desired video resolution, etc.

The protocol stack 94 is initially a container with a communications endpoint. During activation, the stack container is loaded with at least two drivers: a WinStation Driver (WD) and a transport driver (TD). The transport driver is a lower level driver that facilitates transfer of data over the communications transport used to make the connection thus providing transport independence. Additionally, a protocol driver (PD) may be layered between the WD and TD to provide additional features such as compression, reliable data flow, encryption and framing. As an example the WinStation, protocol, and transport drivers might be implemented to handle an RDP data stream over a compressed TCP/IP transport. The WinStation Driver provides remote access to the windowing session being created on the server. The WinStation Driver is implemented as a kernel mode driver (SYS) with entry points that provide for access to a remote mouse, keyboard, character mode display commands, and a set of virtual channels.

After connection with the client is established and the client request for a windowing session is received, the operating system 60 creates a windowing session, which is indicated in FIG. 3 as session 1. In the Citrix WinFrame technology, this windowing session involves running a client-server routine CSRSS.EXE, which is referenced generally as CSRSS module 98. In Windows NT 3.x versions of the operating system, the CSRSS module 98 contains all of the Microsoft-written code for USER, CONSOLE, GDI, and other support routines. In addition, the module 98 contains a collection of hardware device drivers for the hardware display, the GDI interface to the hardware display (GDI driver), the mouse driver, and keyboard driver.

In new versions of the Windows NT server operating system such as Windows NT 4.0 or 5.0, the USER and GDI portions of the CSRSS module 98 are moved to the kernel mode, to a module referred to as WIN32K.SYS 100. The CSRSS module 98 and Win32K module 100 are closely integrated across the user-kernel line. FIG. 3 shows the software modules implemented in the newer versions of Windows NT.

When a client requests a windowing session, the server operating system creates the CSRSS module 98 and Win32K module 100 to open the hardware devices and load the proper GDI display driver 102 and protocol driver 104 that are compatible with the remote client's system configuration. In this example, the client 24(1) is a desktop computer that has a VGA monitor with a resolution of 1024×768 and uses a RDP protocol. After these drivers are loaded, the protocol stack 94 is bound to the windowing session 1. Communications with the client are passed to the windowing session 1, as illustrated by the arrow from the protocol stack 94 to the protocol driver 104.

As part of the session startup, the user at the remote client 24(1) is prompted via a Windows logon (WL) module 106 to enter a user identification (ID). The operating system associates the user ID with the windowing session 1. This is represented by the box labeled "User 1" in the user mode for the windowing session 1.

The server operating system then provides the windowing environment on the client computer 24(1). The client-based code runs a windowing graphical user interface that enables the user to start applications on the server, and perform other functions that are common to Windows-based systems.

With the first protocol stack 94 bound to session 1, the server operating system 60 prepares to accommodate another client by creating a container for a second protocol stack. When a second client connects to the server to run a windowing session, the stack manager 92 assigns the protocol stack to the new client.

Figure 4:
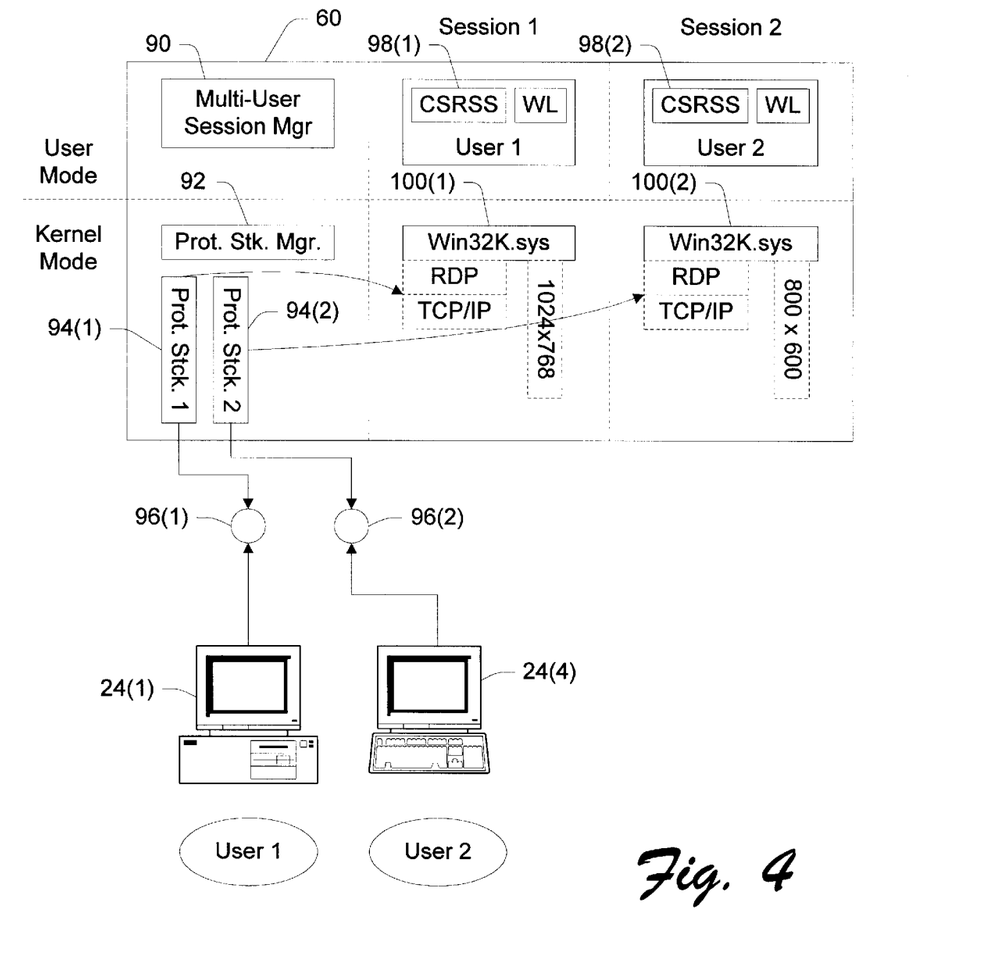
FIG. 4 is a block diagram similar to FIG. 3, but further showing multiple client-server windowing sessions.

FIG. 4 shows a second protocol stack 94(2) connected to a communication port 96(2) for a second client 24(4). The multi-user session manager 90 creates a new client-server windowing session, labeled as session 2, to accommodate the second client 24(4). The second session 2 is a replica of the first session 1, and includes a copy of the CSRSS module 98(2) and the Win32K module 100(2). As described with respect to FIG. 3, the second user 2 logs on and the server operating system loads the appropriate drivers to service the client 24(1). In this case, the client is a terminal computer that has a lower resolution 800×600 display and also employs an RDP display protocol over a TCP/IP transport. The windowing session 2 is bound to the protocol stack servicing the second client machine 24(4).

Each session maintains a container for it's associated protocol stack. In this example, session 1 has an associated protocol stack 94(1) and session 2 has an associated protocol stack 94(2).

As more clients connect to the server, the server operating system 60 continues to replicate more windowing sessions. The ability to replicate the modules to produce multiple client-server windowing sessions is implemented using the WinFrame technology from Citrix Systems Inc. as described in the Background.

Unfortunately, a problem with the Citrix WinFrame technology is a lack of usability from the user perspective. Using WinFrame, each windowing session is bound to a particular client machine and the system configuration of the machine. Assuming a system shown in FIG. 4, the conventional WinFrame technology ties the first windowing session 1 to the system configuration of desktop computer 24(1), including the 1024×768 monitor and a RDP protocol, and ties the second windowing session 2 to the system configuration of the terminal computer 24(4), which has an 800×600 monitor and a RDP protocol.

The Citrix WinFrame technology does not address the needs of the user, who may in fact log on to the server from different physical machines. Thus, when a user stops a windowing session from one client computer and logs onto the server using another client computer, the WinFrame technology will create a new windowing session in the case where the two client computers do not share common video resolutions. The user is not permitted to reconnect to the old session.

In the client-server system of this invention, however, the server operating system is designed to accommodate the user's needs and to support windowing sessions that a user can reconnect to from different machines. Recall from the above example that user 1 is connected to the server using the desktop client 24(1) with a 1024×768 VGA monitor and a RDP protocol.

To continue this example, suppose that user 1 disconnects from the server 60, without terminating the windowing session 1. The user leaves the workplace and goes home. While at home, the user decides to continue the session that he/she began earlier in the day. The user connects to the server from a second client computer located at home.

Figure 5:
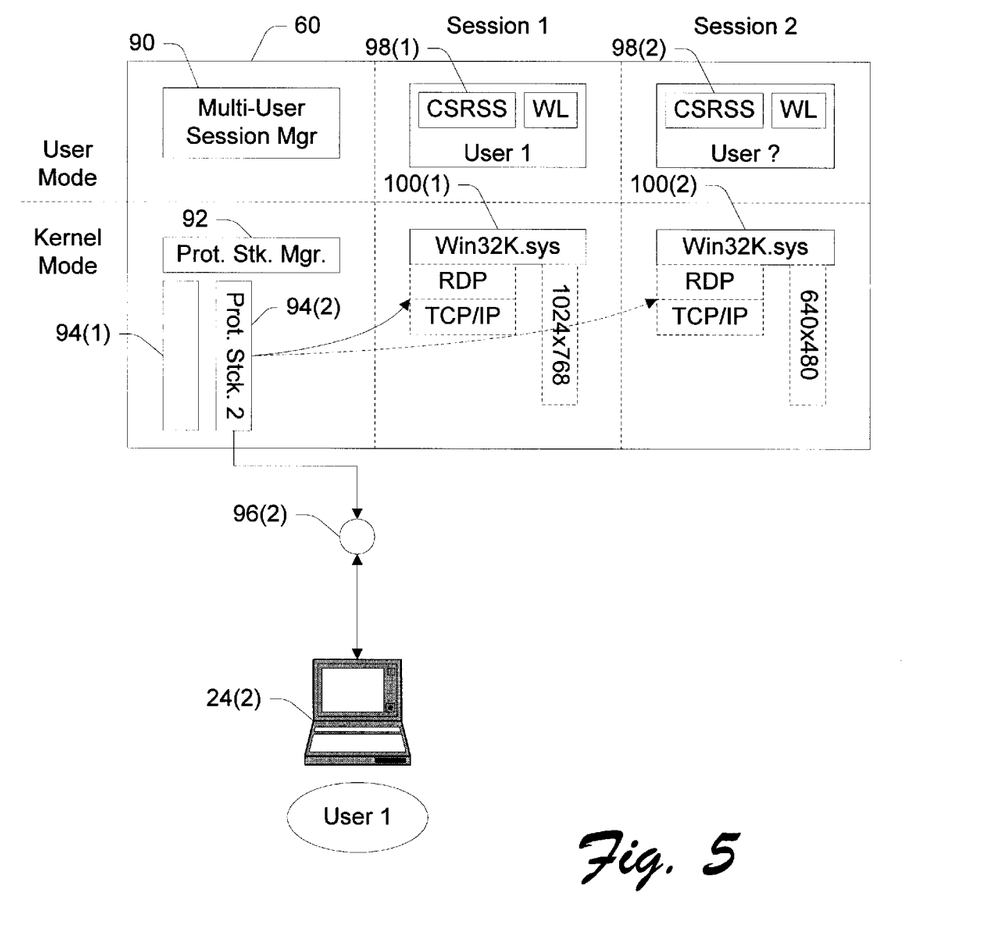
FIGS. 5–6 are block diagrams similar to FIG. 3, but further showing a dynamic reassociation process in which a user is reassociated with a previous windowing session, even though the user logs onto the server using different clients.

FIG. 5 shows the situation in which user 1 first connected to the server using a first client 24(1) to create a first client-server windowing session 1, as described above with respect to FIG. 3, and subsequently connects to the server using a second client 24(2). Upon disconnection of the first session, the container previously loaded with RDP and TCP/IP stack drivers is emptied and its associated communications endpoint is destroyed. This is represented by the empty protocol stack 94(1).

When the user subsequently logs on using the second client 24(2), the multi-user session manager 90 initially creates a second session 2, as if the person logging on is a new user. In this example, the client 24(2) is a laptop computer with a flat panel, 11" color display with a resolution of 640×480. The client 24(2) uses a RDP protocol. Accordingly, the second client 24(2) has a different system configuration than the first client 24(1) used in FIG. 3.

The connection process is identical to that explained with respect to FIG. 3. The multi-user session manager 90 creates and launches a new transfer thread to service the new client request. The protocol stack manager 92 assigns a second protocol stack 94(2) to a communication port 96(2) to which the client 24(2) connects. The second protocol stack 94(2) comprises an empty container with a communications endpoint. The stack manager loads the default drivers into the stack container 94(2) and client communication is passed to the session 2 (as shown by the dashed arrow). During these initializations, the operating system is not yet aware of who the user is.

When the user ID of user 1 is received as part of the log on process, the Windows logon module 106 recognizes that user 1 is affiliated with a previous session, namely session 1. Rather than continuing to create a whole new session, however, the WL module 106 reassociates the user 1 with his/her previous session 1 (as represented by the solid arrow).

The reassociation involves adapting the server operating system to the system configuration parameters of the user's new client computer 24(2). The reassociation process is not visible to the user or client. From the user perspective, the user is returned to the same point in the session at which he/she had left off previously.

According to an aspect of this invention, the server operating system 60 modifies the Win32K module 100(1) in the original session 1 to use different drivers and devices that conform to the client computer 24(2). In this example, the Win32K module 100(1) is adapted to accommodate the smaller 11" display with the lower resolution of 640×480. The server operating system 60 changes the GDI display driver 102(1) from a driver for a 1024×768 VGA monitor to a driver for a 640×480 flat panel color display. Since the client 24(2) employs the same RDP protocol, the Win32K module 100(1) keeps the original protocol driver 104(1).

In addition, another aspect of this invention is reassociating the previous stack contents of the protocol stack used in the original client-server connection to the previous session 1. In the preferred implementation, the stack contents (the WinStation Driver (WD), protocol driver (PD), and transport driver (TD)) from the second stack and the live connection endpoint are moved back over to the first protocol stack 94(1) for the previous session 1.

Figure 6:
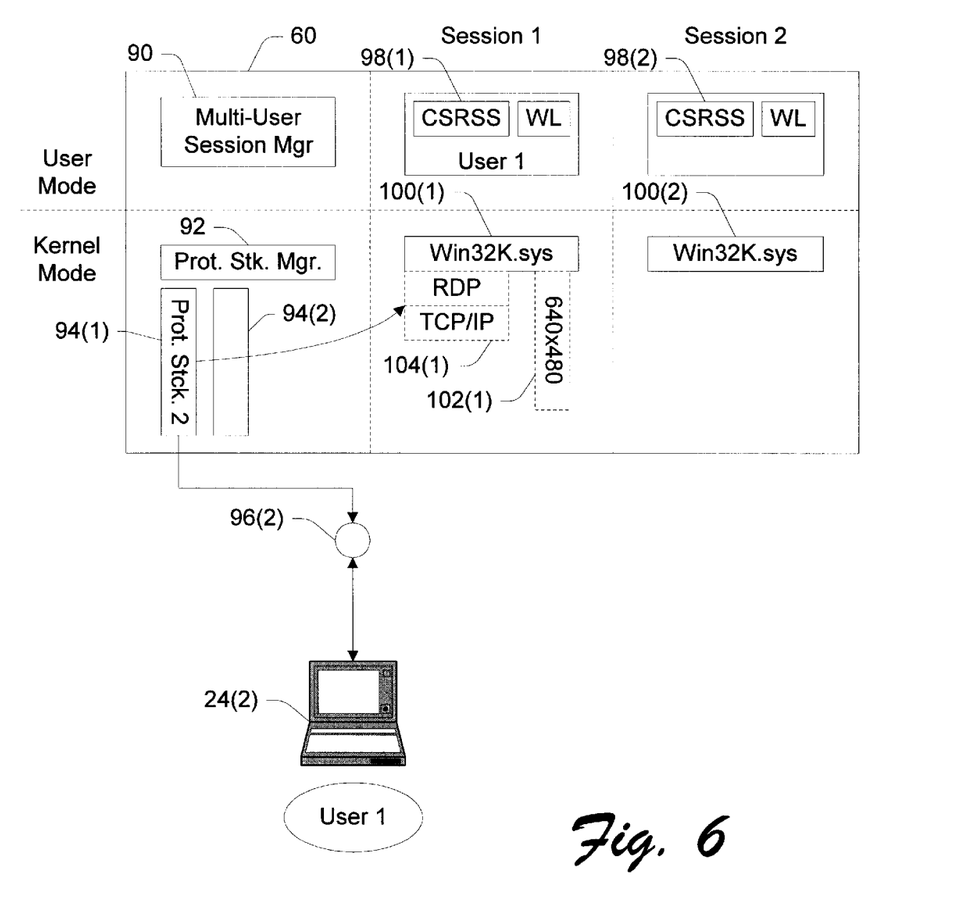

FIG. 6 shows the results of modifying the Win32K module 100(1) to support the new client computer. The display driver 102(1) is now a driver for the 640×480 flat panel color display. Additionally, the stack contents are loaded back into the protocol stack 94(1) for session 1. As a result, the server dynamically adjusts to the client computer that the user is now employing as an access point. Session 2 and its associated protocol stack 94(2) will be destroyed once the re-association is complete.

In this example, the display data is dynamically resized to fit the user's new client computer 24(1). The session appears the same to the user, only it is reformatted for the user's smaller, lower resolution screen. The previous WinFrame technology did not permit this reassociation process, and hence the original session could not be served to the new client computer 24(1).

The above example highlights adapting the server session to conform to a different display size and resolution. This is merely one example. Other possible client configuration parameters that may be accounted for at the server include types of keyboards, keyboard layouts (QWRTY v. Dvorak), protocol types (e.g., RDP over TCP/IP, versus RDP over asynchronous modem), language (e.g., English v. Spanish), memory drives, and peripherals.

Figure 7:
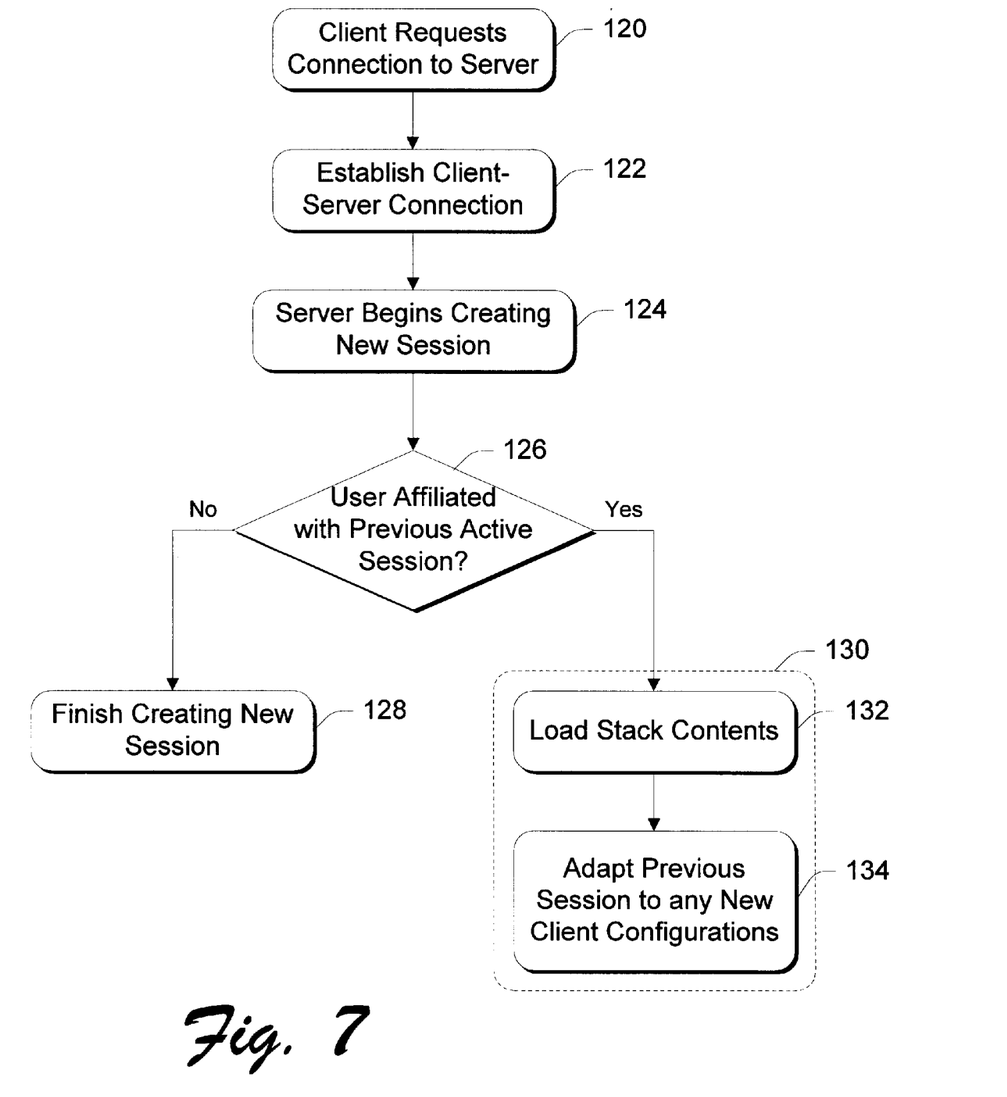
FIG. 7 is a flow diagram showing steps in the reassociation process.

FIG. 7 shows the steps in the dynamic reassociation process. These steps are implemented in code within the server operating system, preferably as part of the multi-user session manager with user authentication software in the Windows logon module. At step 120, a user connects to the server via a client. The server commences the connection process to form a client-server connection (step 122) and begins creating a new client-server windowing session (step 124).

During the initialization process, the server operating system analyzes whether the user is affiliated with any previous active session that has not yet been terminated (step 126). If not (i.e., the "no" branch from step 126), the server operating system finishes creating a new session for the user (step 128).

On the other hand, if the user is affiliated with a previous active session, (i.e., the "yes" branch from step 126), the server operating system reassociates the user with the previous active session (sub-process 130). This involves reassociating (i.e. transferring) the presently connected user's protocol stack and connection endpoint to the original session (step 132) as well as adapting the previous active session to accommodate any system configuration changes suitable for the current client (step 134).

Kiosk Environment

Another aspect of this invention concerns using dynamic reassociation to accommodate multiple users who connect to the server from a single client computer. As an example of this situation, it is common for two or more bank tellers to utilize the same computer or for two or more salespersons to employ one computer register. This environment in which multiple users rely on the same computer is commonly referred to as the "kiosk" environment.

Figure 8:
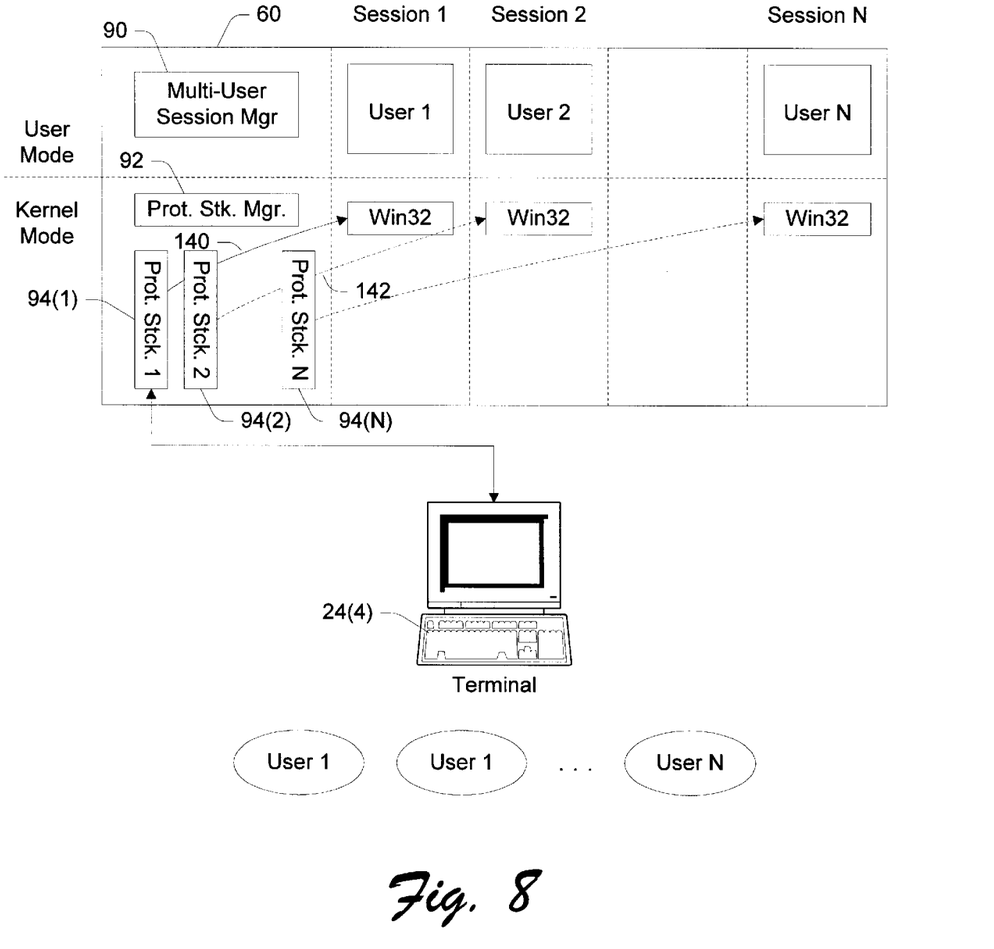
FIG. 8 is a block diagram of part of the server operating system, illustrating how the operating system supports multiple sessions for multiple users, all of whom access the server from the same client.

FIG. 8 shows a client 24(4) connected to the server operating system 60 through a protocol stack 94. Multiple users 1-N use the same client 24(4). The multi-user session manager 90 creates a client-server windowing session for each of the users 1-N. Each windowing session contains a CSRSS module and a Windows logon module, represented as the "user" blocks in the user mode, and the Win32K module in the kernel mode. Each session also has an associated protocol stack 94.

When a first user logs on to the server, the session manager 90 creates a first session 1 for the first user 1. The Win32K module provides the appropriate drivers and devices to implement a windowing session on the terminal 24(4). Internally, the operating system associates the protocol stack 94(1) with session 1 as represented by the solid arrow 140.

When user 1 completes a task, the user freezes the session without logging off or otherwise terminating the session. Another user is then free to use the terminal 24(4). Suppose user 2 logs onto the server. The session manager 90 creates a second session 2 for the second user 2. The Win32K module in session 2 also provides the appropriate drivers and devices to implement a windowing session on the terminal 24(4). The operating system associates the second protocol stack 94(2) with session 2 as represented by the dashed arrow 142. This process can continue for the N users.

Now, when the terminal is again free to use, user 1 may wish to return to session 1. The user retypes his/her ID. The operating system initially begins to create a new session and associated protocol stack. However, when the operating system realizes that the user has a pre-existing disconnected session, the operating system reassociates the user with the existing session 1. The stack contents and live communications endpoint are transferred back to the protocol stack container 94(1) for association with the session 1. In this manner, the server operating system accommodates multiple user sessions from the same client computer.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. In a client-server computer system, a computer-implemented method implemented at a server comprising the following steps:

maintaining a first session at the server for a user who connects to the server via a first client, the first session conforming to a system configuration of the first client;

subsequently establishing a client-server connection for the user who connects to the server via a second client, the second client having a system configuration that is different than the first client;

recognizing the user as being associated with the first session;

adapting the first session to conform to the system configuration of the second client; and reassociating the client-server connection with the first session.

2. A computer-implemented method as recited in claim 1, wherein the first and second clients have different display types, and the adapting step comprises the step of reconfiguring the first session to conform to the display type on the second client.

3. A computer-implemented method as recited in claim 1, wherein:

the system configuration of the first and second clients include parameters selected from a group of parameters comprising display type, keyboard type, network protocol type, peripheral types, human language, and memory drives; and the adapting step comprises the step of changing the first session to conform to at least one of the parameters on the second client.

4. An operating system embodied on a computer-readable medium having computer-executable instructions for performing the computer-implemented method as recited in claim 1.

5. A server computer programmed to perform the computer-implemented method as recited in claim 1.

6. In a client-server computer system, a computer-implemented method implemented at a server comprising the following steps:

creating a connection with a first client, which is being operated by a user;

assigning a first protocol stack to the first client;

logging on the user;

establishing a first session for the first client;

configuring the first session to conform to configuration parameters of the first client;

associating the first session with the first user;

ending the connection with the first client;

subsequently creating a connection to a second client, which is being operated by the same user;

assigning a second protocol stack to the second client;

logging on the user;

detecting the user as being associated with the first session;

reconfiguring the first session to configuration parameters for the second client; and reassociating the first session with the user by transferring contents of the second protocol stack to the first protocol stack associated with the first session so that the user may continue with the first session while using the second client.

7. A computer-implemented method as recited in claim 6, wherein the first and second clients have different display types, and the reconfiguring step comprises the step of modifying the first session to conform to the display type on the second client.

8. An operating system embodied on a computer-readable medium having computer-executable instructions for performing the computer-implemented method as recited in claim 6.

9. A server computer programmed to perform the computer-implemented method as recited in claim 6.

10. In a client-server computer system, a computer-implemented method implemented at a server comprising the following steps:

maintaining a first session at the server for a user who connects to the server via a first client, the first session formatting video data for a first display type corresponding to the first client;

subsequently establishing a client-server connection for the user who connects to the server via a second client, the second client having a second display type that is different than the first client;

recognizing the user as being associated with the first session;

reconfiguring the first session to format the video data for the second display type corresponding to the second client; and reassociating the client-server connection with the first session.

11. An operating system embodied on a computer-readable medium having computer-executable instructions for performing the computer-implemented method as recited in claim 10.

12. A server computer programmed to perform the computer-implemented method as recited in claim 10.

13. In a client-server computer system in which a client is connected to communicate with the server via a client-server connection, a computer-implemented method implemented at a server comprising the following steps:

creating a first session for a first user who accesses to the server from the client;

associating the client-server connection with the first session;

temporarily freezing the first session;

creating a second session for a second user who connects to the server from the client;

associating the client-server connection with the second session;

temporarily freezing the second session; and subsequently reassociating the client-server connection with the first session.

14. An operating system embodied on a computer-readable medium having computer-executable instructions for performing the computer-implemented method as recited in claim 13.

15. A server computer programmed to perform the computer-implemented method as recited in claim 13.

16. An operating system for a server computer, wherein the operating system is embodied on a computer-readable medium, comprising:

a multi-user session manager to enable multiple client-server sessions on the server;

a first session created by the session manager when a user connects to the server from a first client, the first session being configured to accommodate a system configuration of the first client;

a second session created by the session manager when the user subsequently reconnects to the server from a second client different from the first client; and wherein the session manager recognizes that the user is affiliated with the first session and adapts the first session to conform to a system configuration of the second client, the session manager reassociating the user with the reconfigured first session so that the second client communicates with the first session rather than the second session.

17. An operating system as recited in claim 16, wherein the first session includes one or more software modules to support a graphical user interface windowing environment for the first client.

18. An operating system as recited in claim 16, wherein the first session includes at least one of the following software modules: a display driver, a protocol driver, a keyboard driver, and a mouse driver.

19. An operating system as recited in claim 16, wherein the first and second clients have different display types, and the first session is reconfigured from conforming to a first display type on the first client to conforming to a second display type on the second client.

20. An operating system as recited in claim 16, wherein the system configuration of the first and second clients include parameters selected from a group of parameters comprising display type, keyboard type, network protocol type, peripheral types, human language, and memory drives.

21. An operating system for a server computer, wherein the operating system is embodied on a computer-readable medium, comprising:
   a multi-user session manager to enable multiple client-server sessions on the server;
   a multi-user stack protocol manager to manage one or more protocol stacks, the protocol stacks facilitating communication with corresponding clients during the client-server sessions;
   in an event that a user connects to the server from a first client, the stack protocol manager assigns a first protocol stack to a first client-server connection and the session manager creates a first session for the user, the first session being configured to accommodate a system configuration of the first client;
   in an event that the user exits the current session and subsequently reconnects to the server from a second client different from the first client, the stack manager assigns a second protocol stack to a second client-server connection;
   wherein the session manager recognizes the user as being affiliated with the first session and adapts the first session to conform to a system configuration of the second client, the session manager transferring contents of the second protocol stack to the first protocol stack associated with the first session.

22. An operating system as recited in claim 21, wherein the first and second clients have different display types, and the session manager adapts the first session from a first display type on the first client to a second display type on the second client.

23. An operating system as recited in claim 21, wherein the system configuration of the first and second clients include parameters selected from a group of parameters comprising display type, keyboard type, network protocol type, peripheral types, human language, and memory drives.

24. In a server operating system that provides multiple graphical user interface windowing sessions for multiple clients, the server operating system embodied on a computer-readable medium comprising:
   computer readable instructions to direct a server to recognize when a user, who is connecting to the server via a remote client, is associated with a previous windowing session that the user started previously; and
   computer readable instructions to direct the server to reassociate the user with the previous windowing session and to reconfigure the previous windowing session to conform to any different system configurations of the remote client in the event that the remote client is different than a client from which the user originally connected to the server to start the previous windowing session.

25. In a windows-based server operating system embodied on a computer-readable medium at a server, wherein the server operating system is capable of providing multiple client-server graphical user interface windowing sessions for multiple clients, an improvement to the server operating system comprising:
   code means for maintaining sessions at the server after clients disconnect from the server;
   code means for detecting whether a user, who reconnects to the server through a new client, is already affiliated with a previous session;
   code means for adapting the previous session to conform to a system configuration of the new client in an event that the system configuration is different from that of a previous client through which the user was previously connected to the server; and
   code means for reassociating the user with the previous session.

26. In a windows-based server operating system embodied on a computer-readable medium at a server, wherein the server operating system is capable of facilitating multiple client-server sessions in which the server provides a windowing environment for a client, an improvement to the server operating system comprising:
   computer readable instructions to direct a server to recognize when a user, who is connecting to the server via a remote client, is associated with a previous windowing session that the user started previously;
   computer readable instructions to direct the server to adapt the previous windowing session to support a new display type in the event that the new display type is different than an original display type on a client from which the user originally connected to the server to start the previous windowing session; and
   computer readable instructions to direct the server to reassociate the user with the previous windowing session and to reformat data served from the previous windowing session for depiction on the new display type.

27. In a windows-based server operating system embodied on a computer-readable medium at a server, wherein the server operating system is capable of facilitating multiple client-server sessions in which the server provides a windowing environment for a client, an improvement to the server operating system comprising:
   first computer readable instructions to direct a server to recognize when a first user, who is connecting to the server via a remote client, is associated with a previous windowing session that the first user started previously;
   second computer readable instructions to direct the server to reassociate the first user with the previous windowing session;
   the first computer readable instructions further directing a server to recognize when a second user, who is connecting to the server via the same remote client, is associated with a previous windowing session that the second user started previously; and
   the second computer readable instructions further directing the server to reassociate the second user with the previous windowing session.

28. In a client-server computer system, a system comprising:
- a server-based operating system embodied on a computer-readable medium and executed at a server, the server-based operating system enabling multiple graphical user interface windowing sessions for multiple clients;
- a client-based code embodied on a computer-readable medium and executed at a client, the client-based code enabling the client to initiate a connection with the server and to run a local graphical user interface (UI) window to facilitate access to the server-based windowing session; and
- the server-based operating system being implemented to recognize when a user, who is connecting to the server via the client, is associated with a previous windowing session that the user started previously and to reassociate the user with the previous windowing session, the server-based operating system adapting the previous windowing session to conform to any different system configurations of the client in the event that the client is different than a client from which the user originally connected to the server to start the previous windowing session.

29. A system as recited in claim 28, wherein the client-based code is configured to run on a client that is implemented with an operating system that is capable of connecting to the server.

30. In a client-server computer system, a system comprising:
- a server-based operating system embodied on a computer-readable medium and executed at a server, the server-based operating system enabling multiple graphical user interface windowing sessions for multiple clients;
- a client-based code embodied on a computer-readable medium and executed at a client, the client-based code enabling the client to initiate a connection with the server and to run a local graphical window user interface (UI) to the server-based windowing sessions; and
- the server-based operating system being configured to associate communication to and from the client-based code with various ones of the windowing sessions so that multiple users can employ the client to operate their own corresponding windowing sessions.

31. A system as recited in claim 30, wherein the client-based code is configured to run on a client that is implemented with an operating system that is capable of connecting to the server.

* * * * *

UNITED STATES PATENT AND TRADEMARK OFFICE
CERTIFICATE OF CORRECTION

PATENT NO. : 6,085,247
DATED : July 4, 2000
INVENTOR(S) : Parsons, Jr. et al.

It is certified that error appears in the above-identified patent and that said Letters Patent is hereby corrected as shown below:

<u>Title page,</u>
Please insert:

-- Related U.S. Application Data
[63] Provisional Application No. 60/065,991, filed on November 14, 1997. --

<u>Column 1,</u>
Line 6, please insert:

-- RELATED APPLICATION
This application is based on Provisional Application No. 60/065,991, which was filed November 14, 1997, to which priority is claimed. --

Signed and Sealed this

First Day of April, 2003

JAMES E. ROGAN
*Director of the United States Patent and Trademark Office*